United States Patent
Sugamura

(10) Patent No.: US 9,045,121 B2
(45) Date of Patent: Jun. 2, 2015

(54) BRAKE FLUID PRESSURE RETAINER DEVICE

(71) Applicant: TRANSTRON INC., Yokohama-shi, Kanagawa (JP)

(72) Inventor: Nobuo Sugamura, Ayase (JP)

(73) Assignee: TRANSTRON INC., Yokohama (JP)

( * ) Notice: Subject to any disclaimer, the term of this patent is extended or adjusted under 35 U.S.C. 154(b) by 159 days.

(21) Appl. No.: 13/752,767

(22) Filed: Jan. 29, 2013

(65) Prior Publication Data

US 2013/0140881 A1 Jun. 6, 2013

Related U.S. Application Data

(63) Continuation of application No. PCT/JP2010/064250, filed on Aug. 24, 2010.

(51) Int. Cl.
| | | |
|---|---|---|
| *B60T 15/46* | (2006.01) | |
| *B60T 17/04* | (2006.01) | |
| *B60T 13/68* | (2006.01) | |
| *B60T 7/12* | (2006.01) | |

(Continued)

(52) U.S. Cl.
CPC .............. *B60T 17/04* (2013.01); *F16K 17/26* (2013.01); *B60T 8/34* (2013.01); *B60T 8/4872* (2013.01); *F16K 17/30* (2013.01); *B60T 13/686* (2013.01); *B60T 7/122* (2013.01)

(58) Field of Classification Search
CPC ....... B60T 8/34; B60T 13/686; B60T 8/4872; B60T 5/5012; F16K 17/26; F16K 17/30

USPC ............ 303/84.2, 113.1, 114.2, 116.1, 119.1, 303/119.2, 84.1; 137/157, 601.14, 601.2, 137/601.21
See application file for complete search history.

(56) References Cited

U.S. PATENT DOCUMENTS

| | | | | |
|---|---|---|---|---|
| 4,453,782 | A | * | 6/1984 | Arikawa et al. ............. 303/116.1 |
| 5,148,830 | A | * | 9/1992 | Liu .............................. 137/513.7 |

(Continued)

FOREIGN PATENT DOCUMENTS

| | | |
|---|---|---|
| JP | 4-95867 | 8/1992 |
| JP | 5-310117 | 11/1993 |

(Continued)

OTHER PUBLICATIONS

Patent Abstracts of Japan, Publication No. 2000-190828, Published Jul. 11, 2000.

(Continued)

*Primary Examiner* — Thomas Irvin
(74) *Attorney, Agent, or Firm* — Staas & Halsey LLP

(57) ABSTRACT

A brake fluid pressure retainer device for use in a vehicle incorporating a fluid pressure braking device includes an electromagnetic open-close valve disposed in a middle of a brake fluid passage between a brake pedal and a braking device provided for wheels, and a movable shutoff valve disposed in parallel with the electro-magnetic open-close valve for the brake fluid passage. The movable shutoff valve includes a movable valve body movable in a flowing direction of a brake fluid, a valve seat to be pressed by a front end to shut off the brake fluid, and a spring to apply force to the movable valve body in a direction in which the movable valve body moves away from the valve seat. A direction in which the movable valve body moves toward the valve seat is the flowing direction of the brake fluid.

9 Claims, 15 Drawing Sheets

(51) Int. Cl.
*F16K 17/26* (2006.01)
*B60T 8/34* (2006.01)
*B60T 8/48* (2006.01)
*F16K 17/30* (2006.01)

(56) References Cited

U.S. PATENT DOCUMENTS

| | | | |
|---|---|---|---|
| 5,316,378 A | 5/1994 | Maehara | |
| 5,405,191 A * | 4/1995 | Nishiyama et al. | 303/113.2 |
| 5,584,539 A * | 12/1996 | Hashida | 303/113.2 |
| 5,921,638 A * | 7/1999 | Higashimura et al. | 303/116.1 |
| 6,082,830 A * | 7/2000 | Volz et al. | 303/113.4 |
| 6,116,702 A * | 9/2000 | Maehara | 303/116.1 |
| 6,302,498 B1 * | 10/2001 | Ariki et al. | 303/115.4 |
| 6,332,655 B1 * | 12/2001 | Kamiya et al. | 303/119.2 |
| 6,415,897 B1 | 7/2002 | Sugimoto et al. | |
| 6,547,344 B2 * | 4/2003 | Hada et al. | 303/191 |
| 7,341,320 B2 * | 3/2008 | Otsuka et al. | 303/119.2 |
| 7,484,816 B2 * | 2/2009 | Maruyama et al. | 303/191 |
| 2006/0113835 A1 * | 6/2006 | Krueger et al. | 303/119.2 |
| 2007/0236084 A1 * | 10/2007 | Frank et al. | 303/119.2 |

FOREIGN PATENT DOCUMENTS

| | | |
|---|---|---|
| JP | 2000-190828 | 7/2000 |
| JP | 2005-22535 | 1/2005 |

OTHER PUBLICATIONS

Patent Abstracts of Japan, Publication No. 05-310117, Published Nov. 22, 1993.
Patent Abstracts of Japan, Publication No. 2005-022535, Published Jan. 27, 2005.
International Search Report of PCT/JP2010/064250 mailed Sep. 21, 2010.

* cited by examiner

BRAKE FLUID PRESSURE RETAINER DEVICE

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2010/064250 filed on Aug. 24, 2010, the entire contents of which are incorporated herein by reference.

FIELD

The embodiments discussed herein relate to a brake fluid pressure retainer device.

BACKGROUND

Large-sized vehicles such as trucks frequently incorporate a braking force retainer device configured to apply brakes automatically to retain the vehicles in unmoved states. As an example of the braking force retainer device, a brake fluid pressure retainer device capable of being incorporated into a fluid pressure braking device may be given. The brake fluid pressure retainer device is configured to automatically maintain a brake fluid pressure applied to a braking device for wheels persistently when the vehicle is stopped by applying brakes to the wheels. Accordingly, a status of the brakes being applied to the wheels may be retained without a driver depressing a brake pedal.

The brake fluid pressure retainer device includes an electromagnetic open-close valve disposed on a brake fluid supply pipe. The electromagnetic open-close valve is disposed in a middle of the brake fluid supply pipe connected between the brake pedal and the braking device (e.g., a caliper) for the wheels. Hence, when the driver depresses the brake pedal, (i.e., when the brakes are applied), a brake fluid passes through the electromagnetic open-close valve to flow toward a braking device side of the wheels, which may raise the brake fluid pressure inside the braking device to increase braking force. When the driver eases the depressed brake pedal, (i.e., when the applied brakes are released), the brake fluid passes through the electromagnetic open-close valve to flow back to a brake pedal side, which may lower the brake fluid pressure inside the braking device to decrease the braking force.

To maintain the brake fluid, the electromagnetic open-close valve is closed while the brake fluid pressure inside the braking device for the wheels is high. Accordingly, the brakes being applied to the wheels may be maintained. That is, the electromagnetic open-close valve may air-tightly close in the above fashion to maintain a high pressure brake fluid inside the braking device. As the electromagnetic open-close valve, a so-called "normally-open" electromagnetic open-close valve configured to be closed when a current is supplied to a solenoid may frequently be used.

When the brake fluid pressure inside the braking device is maintained by air-tightly closing the electromagnetic open-close valve, the electromagnetic open-close valve may need to be closed completely.

Otherwise, the brake fluid may leak from the brake pedal side, thereby failing to maintain the brake fluid pressure inside the braking device. Accordingly, the electromagnetic open-close valve may need to have a structure capable of being air-tightly closed completely without allowing the brake fluid pressure to cause leakage from the electromagnetic open-close valve. In order to reduce a size of the electromagnetic open-close valve, an electromagnetic force (corresponding to a pressing force to press a valve against a valve seat) generated from the solenoid may need to be reduced. Accordingly, the electromagnetic open-close valve is configured to have a reduced cross-section of an opening part of a brake fluid passage, such that the electromagnetic open-close valve may be completely closed by a small-sized solenoid (i.e., a small electromagnetic force).

However, when the size of the cross-section of the opening part of the brake fluid passage is reduced, the reduced part of the cross-section of the opening part may generate a brake fluid pressure to serve as a resistance against the brake fluid that passes through the opening part of the brake fluid passage inside the electromagnetic open-close valve. Accordingly, the brake fluid will not flow rapidly inside the electromagnetic open-close valve, thereby degrading responsiveness of the brakes. In order to overcome the degraded responsiveness of the brakes, there is proposed a technology to dispose a check valve (non-return valve) in parallel with the electromagnetic open-close valve (see Patent Document 1). The check valve is configured to allow the brake fluid to flow from the brake pedal side to the braking device side, and to prevent the brake fluid from flowing from the braking device side to the brake pedal side.

RELATED ART DOCUMENTS

Patent Document

Patent Document 1: Japanese Laid-open Patent Publication No. 2005-22535

As described above, the brake fluid may rapidly flow from the brake pedal side to the braking device side by disposing the check valve in parallel with the electromagnetic open-close valve, and the responsiveness of the brakes applied to the wheels when depressing the brake pedal may be improved. However, the brake fluid flowing from the braking device side to the brake pedal side may still need to pass through the brake fluid passage of the electromagnetic open-close valve. Hence, responsiveness of the brakes when the brake pedal is returned to the original position to release the brakes may remain unimproved. Specifically, viscosity of the brake fluid is high when an ambient temperature is low, and hence, the brake fluid passage inside the electromagnetic open-close valve may serve as a high resistance. This may extremely degrade the responsiveness of the brakes when the driver releases the brakes.

Further, the electromagnetic open-close valve has a structure in which the brake fluid passage is air-tightly closed while the electromagnetic open-close valve is activated. Hence, the brake fluid passage is air-tightly closed by causing a valve body to be pressed against the valve seat by the electromagnetic attraction force generated by the solenoid of the electromagnetic open-close valve. That is, in order to maintain the brake fluid pressure, the electromagnetic open-close valve is maintained to be in a closed status by applying a voltage to the solenoid to supply a current to the electromagnetic open-close valve. When the voltage applied to the solenoid is lowered while the vehicle is stopped to activate the brake fluid pressure retainer device and the brake fluid pressure is retained, the electromagnetic attraction force generated by the solenoid may be reduced. In this case, the pressing force to press the valve body against the valve seat for air-tightly closing the fluid passage is reduced, which may lead to a failure in which the brake fluid passage is not completely closed causing brake fluid leakage. For example, when an engine starter is activated for initiating an engine while the electromagnetic open-close valve is activated and the brake fluid pressure is retained, a power supply voltage (i.e., a battery voltage) is drastically dropped. Accordingly, the voltage applied to the solenoid of the electromagnetic open-close valve is also drastically lowered. In this case, the pressing force to press the valve body to the valve seat may be substantially reduced. This may allow the brake fluid to leak from an interval between the valve body and the valve seat, which may cause failure to retain the brake fluid pressure.

SUMMARY

According to an aspect of an embodiment, there is provided a brake fluid pressure retainer device for use in a vehicle incorporating a fluid pressure braking device. The brake fluid pressure retainer device includes an electromagnetic open-close valve disposed in a middle of a brake fluid passage between a brake pedal and a braking device provided for wheels; and a movable shutoff valve disposed in parallel with the electro-magnetic open-close valve for the brake fluid passage. In the brake fluid pressure retainer device, the movable shutoff valve includes a movable valve body movable in a flowing direction of a brake fluid; a valve seat configured to be pressed by a front end of the movable valve body to shut off the brake fluid; and a spring configured to apply force to the movable valve body in a direction in which the movable valve body moves away from the valve seat, where a direction in which the movable valve body moves toward the valve seat is the flowing direction of the brake fluid.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

Other objects, features, and advantages of the present invention will become more apparent from the following detailed description when read in conjunction with the accompanying drawings.

DESCRIPTION OF EMBODIMENTS

In the following, embodiments are described with reference to accompanying drawings.

Figure 1:
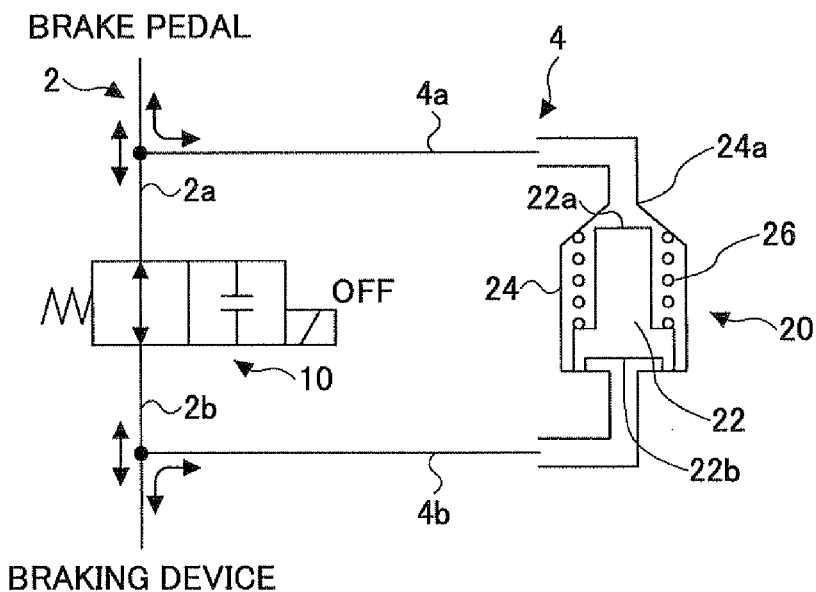
FIG. 1 is a fluid pressure circuit diagram illustrating an overall configuration of a brake fluid pressure retainer device according to a first embodiment.
Figure 2:
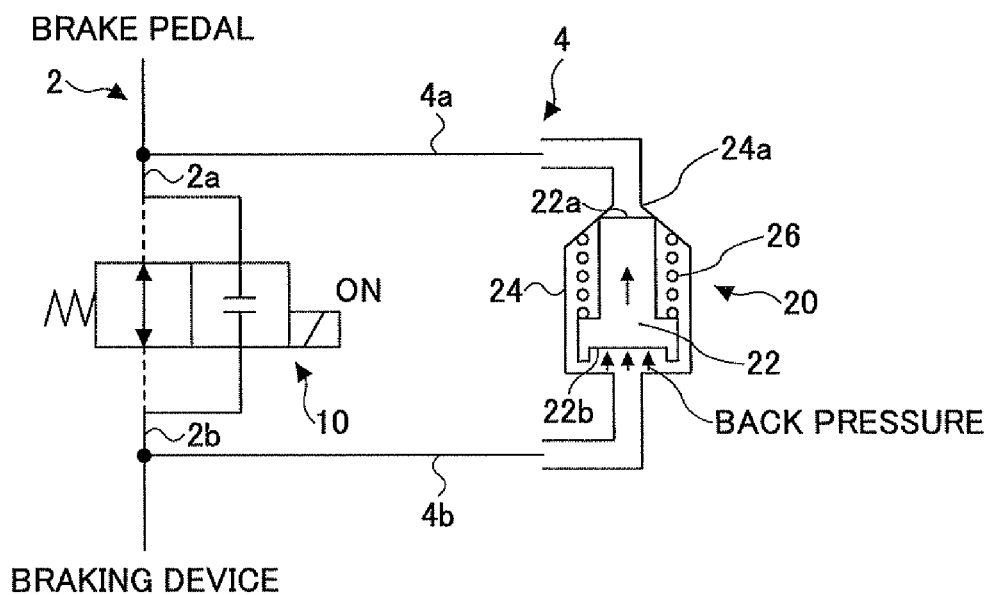
FIG. 2 is another fluid pressure circuit diagram illustrating the overall configuration of the brake fluid pressure retainer device according to the first embodiment.

First, a brake fluid pressure retainer device according to a first embodiment is described. FIGS. 1 and 2 are fluid pressure circuit diagrams each illustrating an overall configuration of a brake fluid pressure retainer device according to the first embodiment. FIG. 1 illustrates a status where the brake fluid pressure retainer device retains no brake fluid pressure, and brakes are capable of being normally applied.

FIG. 2 illustrates a status where the brake fluid pressure retainer device retains a brake fluid pressure.

The brake fluid pressure retainer device according to the first embodiment includes an electromagnetic open-close valve (a solenoid valve) 10 disposed in the middle of a brake fluid passage (a pipe) 2 connected between a brake pedal and a braking device (e.g., a brake caliper), and a movable shutoff valve 20 connected in parallel with the electromagnetic open-close valve 10.

The electromagnetic open-close valve 10 is a normally-open electromagnetic open-close valve configured to be closed by the application of a voltage to shut off a brake fluid passage. FIG. 1 illustrates a status where a voltage is not applied to the electromagnetic open-close valve 10 and the electromagnetic open-close valve 10 is open. In this status, the brake fluid may flow through the electromagnetic open-close valve 10 from a brake pedal side to a braking device side, or may flow through the electromagnetic open-close valve 10 from the braking device side to the brake pedal side. The electromagnetic open-close valve 10 is open while a vehicle is normally running, such that a normal braking operation may be performed. FIG. 2 illustrates a status where a voltage is applied to the electromagnetic open-close valve 10 to activate the electromagnetic open-close valve 10, such that the electromagnetic open-close valve 10 is closed. In this status, the brake fluid passage 2 is closed by the electromagnetic open-close valve 10. Hence, the brake fluid is not allowed to flow from the braking device side to the brake pedal side nor is it allowed to flow from the brake pedal side to the braking device side.

As described above, the electromagnetic open-close valve 10 is disposed on the brake fluid passage 2 such that the brake fluid does not return from the braking device side to the brake pedal side by closing the electromagnetic open-close valve 10. Accordingly, the brake fluid pressure may be retained inside the braking device. However, in this embodiment, since an electromagnetic drive part (solenoid) of the electromagnetic open-close valve 10 is reduced in size, the electromagnetic open-close valve 10 has weak closing power. Accordingly, a cross-section of the brake fluid passage 2 inside the electromagnetic open-close valve 10 may be reduced in size. Accordingly, since the electromagnetic open-close valve 10 is disposed in the brake fluid passage 2, the brake fluid is not allowed to flow rapidly inside the brake fluid passage 2, thereby degrading responsiveness of brakes.

Thus, according to this embodiment, the movable shutoff valve 20 is connected to the brake fluid passage 2 such that the movable shutoff valve 20 is disposed in parallel with the electromagnetic open-close valve 10, thereby forming a bypass passage 4, through which the brake fluid flows into the electromagnetic open-close valve 10. The movable shutoff valve 20 allows the brake fluid to flow from the brake pedal side to the braking device side and also to flow from the braking device side to the brake pedal side when the electromagnetic open-close valve 10 is open. On the other hand, the electromagnetic open-close valve 10 is closed when the brakes are released and the brake fluid is about to flow from the braking device side to the brake pedal side. In this case, the movable shutoff valve 20 is closed so as to prevent the brake fluid from flowing, from the braking device side to the brake pedal side.

Thus, the brake fluid may be able to flow both through the electromagnetic open-close valve 10 and the movable shutoff valve 20 in a normal braking operation when a vehicle is normally running, which may allow the brake fluid to flow rapidly to improve the responsiveness of the brakes. To maintain the brakes when the vehicle is stopped, the electromagnetic open-close valve 10 is closed to automatically close the movable shutoff valve 20. Accordingly, the brake fluid will not flow from the braking device side to the brake pedal side, which may allow the brake fluid pressure to be retained inside the braking device.

Next, a structure to allow the above-described operation of the movable shutoff valve 20 is described below.

The movable shutoff valve 20 includes a movable valve body 22 and a case 24 configured to contain the movable valve body 22. The case 24 may be a cylindrical shape. That is, the case 24 is tapered so that the case 24 gradually becomes thinner at one end, and a valve seat 24a is disposed on the thinner part of the case 24. Although the valve seat 24a may be formed of an elastic member such as rubber or plastic, it is preferable that the valve seat 24a be formed of a hard material such as metal or ceramics to secure durability. An opening of the valve seat 24a is connected to a brake fluid passage 2a, which is connected between the brake pedal and the electromagnetic open-close valve 10 via a bypass passage 4a. Hence, the brake fluid may flow from the brake pedal side into the movable shutoff valve 20 through the opening of the valve seat 24a, or the brake fluid may also flow from the movable shutoff valve 20 to the brake pedal side.

The movable valve body 22 is movably accommodated in the case 24. The movable valve body 22 has a cylindrical shape having one tapered end 22a so that the movable valve body 22 is accommodated in the cylindrical case 24. The tapered one end 22a is disposed such that the tapered one end 22a faces the valve seat 24a of the case 24. The tapered one end 22a of the movable valve body 22 is hereinafter referred to as a "front end part" 22a. Although the front end part 22a of the movable valve body 22 may be formed of an elastic member such as rubber or plastic, it is preferable that the front end part 22a of the movable valve body 22 be formed of a hard material such as metal or ceramics to secure durability.

When the movable valve body 22 moves so that the front end part 22a of the movable valve body 22 is brought into contact with (or seated on) the valve seat 24a of the case 24, the opening of the valve seat 24a is closed with the front end part 22a of the movable valve body 22.

FIG. 2 illustrates the status in which the movable shutoff valve 20 is closed.

Inside the case 24, force is applied by a spring 26 to the movable valve body 22 in a direction in which the movable valve body 22 moves away from the valve seat 24a. Accordingly, the front end part 22a of the movable valve body 22 normally moves away from the valve seat 24a, and the opening of the valve seat 24a is in an open state. That is, when a normal braking operation is performed while the vehicle is running, the electromagnetic open-close valve 10 is open and the movable shutoff valve 20 is in an open state. The spring 26 applying force to the movable valve body 22 may, for example, be a coil spring. That is, the spring 26 may be any elastic member configured to generate a weak spring force so as to maintain the movable valve body 22 to move away from the valve seat 24a when an external force is not applied to the movable valve body 22.

A diameter of a rear end surface 22b on the other side of the front end part 22a of the movable valve body 22 is greater than a diameter of the front end part 22a. The rear end surface 22b faces a part where the bypass passage 4b is connected to the case 24, such that the rear end surface 22b receives a pressure generated by the flow of the brake fluid. That is, when the brake fluid flows from the bypass passage 4b into the case 24, the brake fluid collides with the rear end surface 22b, which causes a back pressure to be applied to the rear end surface 22b. The back pressure increases with the amount of the brake fluid flowing from the bypass passage 4b into the case 24.

As illustrated in FIG. 1, when the normal brake operation is performed and the electromagnetic open-close valve 10 is open, the brake fluid flowing through the brake fluid passage 2 passes through the electromagnetic open-close valve 10. Part of the brake fluid flowing through the brake fluid passage 2 flows through the bypass passage 4, passes though the opened movable shutoff valve 20, and then returns to the brake fluid passage 2.

Accordingly, the amount of brake fluid flowing through the bypass passage 4 is not substantial, such that only a relatively low back pressure may be applied to the rear end surface 22b of the movable valve body 22. In this case, since the spring force of the spring 26 is configured to be greater than the back pressure applied to the rear end surface 22b of the movable valve body 22, the movable valve body 22 moves to a position away from the valve seat 24a as illustrated in FIG. 1. Thus, the open state of the movable shutoff valve 20 is maintained.

Figure 3A:
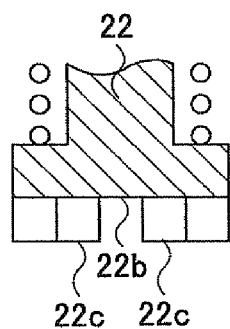
FIG. 3A is a cross-sectional diagram illustrating a rear end part of a movable valve body.
Figure 3B:
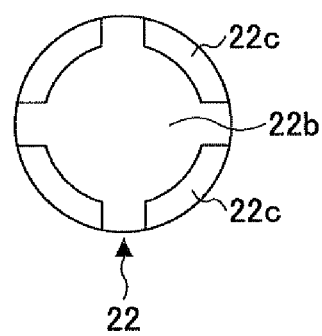
FIG. 3B is a plan diagram illustrating the rear end part of the movable valve body.

Note that it is preferable to form projections 22c on the rear end surface 22b of the movable valve body 22 as illustrated in FIGS. 3A and 3B in order not to block off a connecting port of the bypass passage 4b toward the case 24. The brake fluid flowing from the bypass passage 4b into the case 24 passes through a space between the projections 22, flows along an outer circumferential surface of the movable valve body 22, passes through an opening of the valve seat 24a, and then flows through the bypass passage 4a.

At this moment, when the vehicle is stopped to initiate retaining of the brakes, the electromagnetic open-close valve 10 is closed. Accordingly, all the high pressure brake fluid returned from the braking device side may flow into the movable shutoff valve 20 via the bypass passage 4b. Hence, a large amount of the brake fluid may collide with the rear end surface 22b of the movable valve body 22, such that the back pressure applied to the rear end surface 22b becomes greater than the spring force of the spring 26. The back pressure causes the movable valve 22 to move in a direction toward the valve seat 24a so that the front end part 22a of the movable valve body 22 comes in contact with the valve seat 24a. Thus, the opening of the valve seat 24a is closed with the front end part 22a of the movable valve body 22, thereby preventing the brake fluid from flowing through the bypass passage 4a.

In this state, the brake fluid having a high pressure remains in the case 24 of the movable shutoff valve 20, whereas the brake fluid inside the bypass passage 4a connected to the brake pedal side has a low pressure, thereby generating a differential pressure. Hence, the differential pressure generated in the area of the opening of the valve seat 24a is applied to the movable valve body 22, and the movable valve body 22 is pressed against the valve seat 24a. Accordingly, the movable shutoff valve is completely closed. That is, an initial force to move the movable valve 22 is the back pressure generated by allowing the brake fluid to collide with the rear end surface 22b. However, once the movable shutoff valve 20 is closed, the brake fluid pressure inside the movable shutoff valve 20 is applied to the movable valve body 22 to automatically close the movable shutoff valve 20 completely. The force to close the movable shutoff valve 20 is maintained insofar as the pressure of the brake fluid on the braking device side is retained.

As described above, when the brakes are applied to stop the vehicle, a voltage is immediately applied to the electromagnetic open-close valve 10 to close the electromagnetic open-close valve 10. Further, the flow of the brake fluid passing through the bypass passage 4b causes the movable valve body 22 to be in contact with the valve seat 24a to generate the differential pressure of the brake fluid to close the movable shutoff valve 20 completely. Thus, the brake fluid will not flow from the braking device side to the brake pedal side, thereby allowing the brake fluid to be retained inside the braking device.

In order to release the thus retained brakes, the electromagnetic open-close valve 10 may be opened by deactivating the electromagnetic open-close valve 10. When the electromagnetic open-close valve 10 is opened, the brake fluid on the braking device side flows toward the brake pedal side via the electromagnetic open-close valve 10, thereby lowering the pressure of the brake fluid on the braking device side. When the pressure of the brake fluid on the braking device side is lowered, the brake fluid pressure inside the movable shutoff valve 20 is lowered. Accordingly, there remains no differential pressure applied to the movable valve body 22. Thus, the movable valve body 22 is moved by the spring force of the spring 26 in a direction where the movable valve body 22 moves away from the valve seat 24a, so that the movable shutoff valve 20 is opened as illustrated in FIG. 1.

Note that it is preferable that the valve seat 24a of the movable shutoff valve 20 be disposed at an upper side. That is, with the above configuration, the force is applied to the movable valve body 22 by its gravity in a direction where the movable valve body 22 moves away from the valve seat 24a. Hence, even when the spring force is not applied to the movable valve body 22 due to defect of the spring 26, a status where the movable valve body 22 moves away from the valve seat 24a may be maintained.

Note that the brake fluid pressure retainer device according to the first embodiment includes the electromagnetic open-close valve 10, and the movable shutoff valve 20 connected in parallel with the electromagnetic open-close valve 10. However, the electromagnetic open-close valve 10 and the movable shutoff valve 20 may be formed of separate components that are connected to each other via a pipe, or may be integrally formed as one component as described later.

Next, a brake fluid pressure retainer device according to a second embodiment is described.

Figure 4:
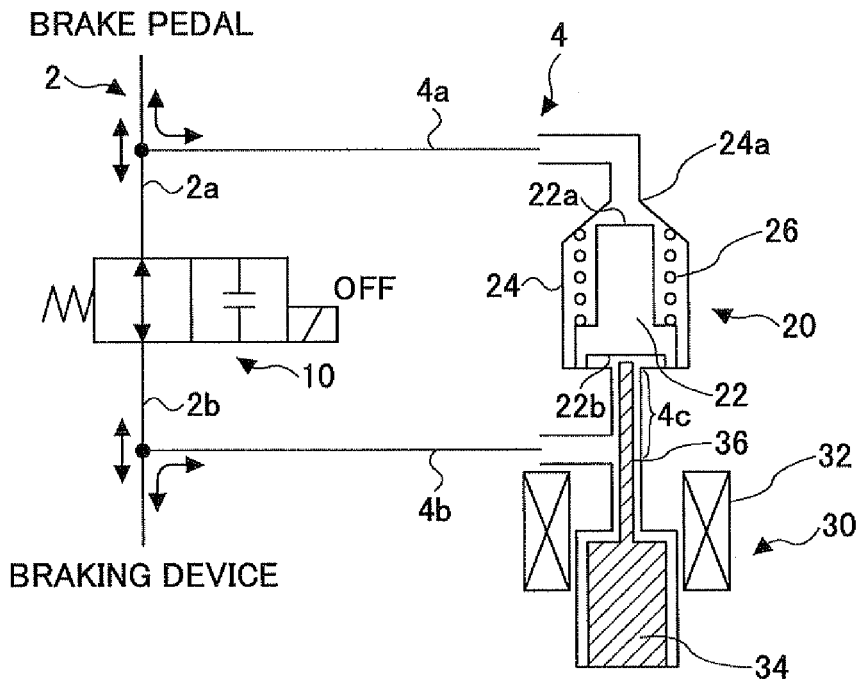
FIG. 4 is a fluid pressure circuit diagram illustrating an overall configuration of a brake fluid pressure retainer device according to a second embodiment.
Figure 5:
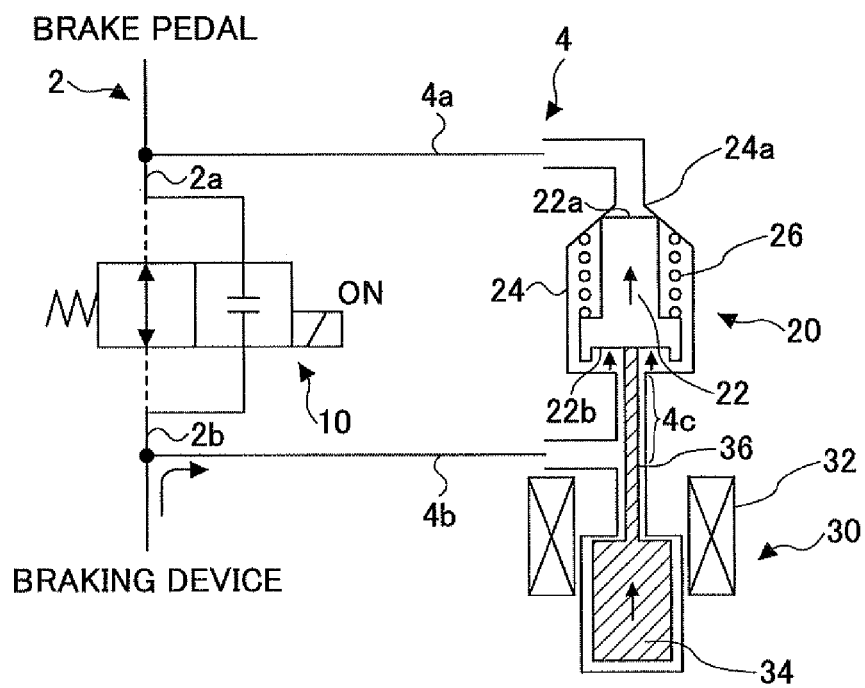
FIG. 5 is another fluid pressure circuit diagram illustrating the overall configuration of the brake fluid pressure retainer device according to the second embodiment.

FIGS. 4 and 5 are fluid pressure circuit diagrams each illustrating an overall configuration of a brake fluid pressure retainer device according to the second embodiment. FIG. 4 illustrates a status where the brake fluid pressure retainer device retains no brake fluid pressure, and brakes are capable of being normally applied. FIG. 5 illustrates a status where the brake fluid pressure retainer device retains a brake fluid pressure. In FIGS. 4 and 5, components similar to those illustrated in FIGS. 1 and 2 are provided with the same reference numerals, and the descriptions of such components are omitted.

The brake fluid pressure retainer device according to the second embodiment includes a configuration similar to that of the brake fluid pressure retainer device according to the first embodiment, except that the brake fluid pressure retainer device according to the second embodiment further includes an electromagnetic driving part 30 configured to move the movable valve body 22. In the second embodiment, the electromagnetic driving part 30 is a solenoid having an electromagnetic coil 32 and a solenoid plunger 34 driven by magnetic force generated by the electromagnetic coil 32. The solenoid plunger 34 is formed of a magnetic body that is driven by the magnetic force generated by the electromagnetic coil 32.

A movable member 36 is extended from the solenoid plunger 34. The movable member 36 is extended such that the movable member 36 passes through a piping part 4c of the bypass passage 4b, and a front end of the movable member 36 is located close to the rear end surface 22b of the movable valve body 22. The piping part 4c has a thicker configuration having a large inner diameter so as to accommodate the movable member 36.

When a current is not supplied to the electromagnetic coil 32 of the electromagnetic driving part 30, a magnetic force is not generated from the electromagnetic coil 32. In this state, the solenoid plunger 34 is located at a position illustrated in FIG. 4, and the front end of the movable member 36 moves away from the movable valve body 22. When a current is supplied to the electromagnetic coil 32 of the electromagnetic driving part 30, a magnetic force is generated from the electromagnetic coil 34. In this state, the solenoid plunger 34 is driven by the generated magnetic force so as to move the solenoid plunger 34 in a direction where the movable valve body 22 moves toward the valve seat 24a. The movable member 36 moves toward the movable valve body 22 along with the movement of the solenoid plunger 34, such that the movable member 36 comes in contact with and presses the rear end surface 22b of the movable valve body 22. Accordingly, the movable valve body 22 moves toward the valve seat 24a, and the front end part 22a of the movable valve body 22 is brought in contact with the valve seat 24a such that the movable shutoff valve 20 is closed as illustrated in FIG. 5.

The electric current is applied to the electromagnetic coil 32 simultaneously with closing the electromagnetic open-close valve 10 for retaining the brakes, which causes the movable member 36 to press the movable valve body 22 to forcibly close the movable shutoff valve 20. That is, in the first embodiment, the movable valve body 22 is moved by the brake fluid pressure generated by the flow of the brake fluid to bring the movable valve body 22 into contact with the valve seat 24a. However, pressing force generated by driving the solenoid plunger 34 may also be used for rapidly moving the movable valve body 2 to close the movable shutoff valve 20.

With the back pressure generated by the flow of the brake fluid alone, the brake fluid pressure to be retained may be lowered by allowing the brake fluid to flow from the movable shutoff valve 20 into the bypass passage 4a. However, since the brake fluid pressure retainer device according to the second embodiment includes the electromagnetic driving part 30, which causes the movable shutoff valve 20 to be rapidly closed. Accordingly, the brake fluid pressure to be retained may be prevented from lowering.

Further, the electric current may be continuously supplied to the electromagnetic coil 32 after the movable shutoff valve 20 is closed. Accordingly, the movable valve body 22 may be continuously pressed on the valve seat 24a so as to securely make the movable shutoff valve 20 remain closed.

Next, a brake fluid pressure retainer device according to a third embodiment is described.

Figure 6:
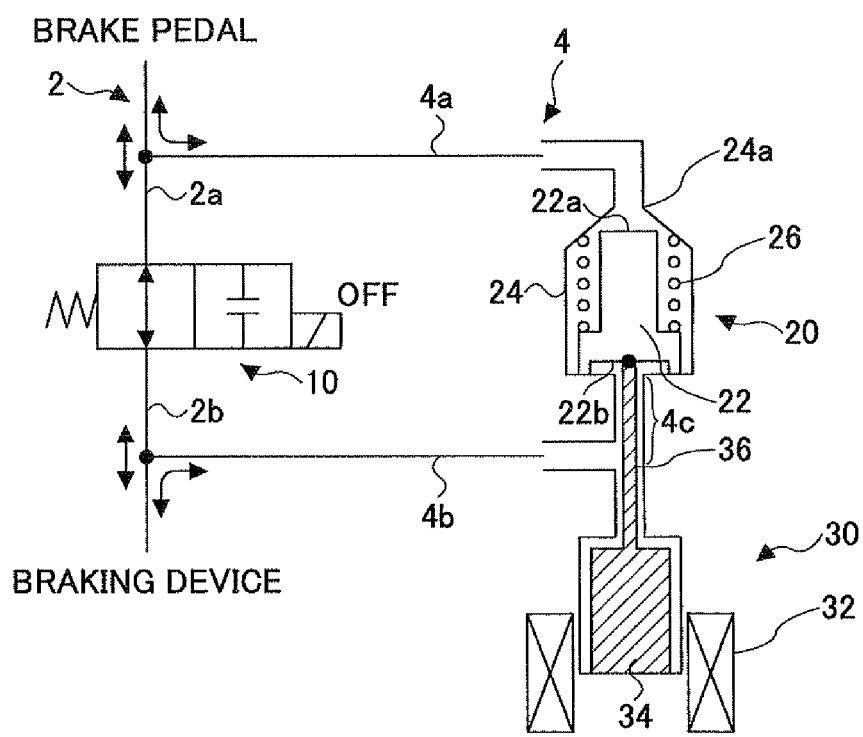
FIG. 6 is a fluid pressure circuit diagram illustrating an overall configuration of a brake fluid pressure retainer device according to a third embodiment.
Figure 7:
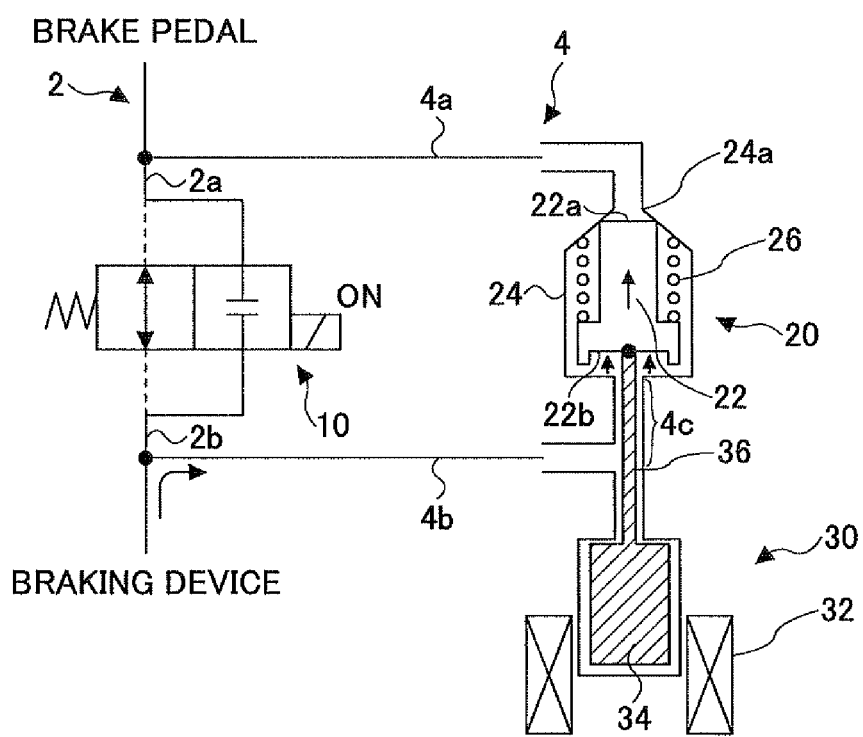
FIG. 7 is another fluid pressure circuit diagram illustrating the overall configuration of the brake fluid pressure retainer device according to the third embodiment.
Figure 8:
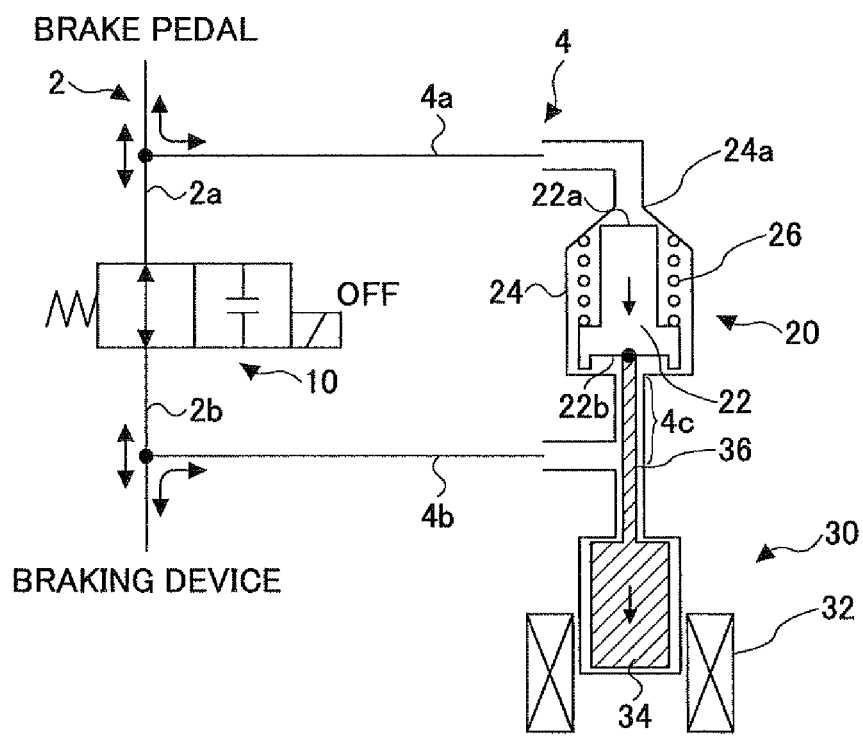
FIG. 8 is another fluid pressure circuit diagram illustrating the overall configuration of the brake fluid pressure retainer device according to the third embodiment.

FIGS. 6 to 8 are fluid pressure circuit diagrams each illustrating an overall configuration of a brake fluid pressure retainer device according to the third embodiment. FIG. 6 illustrates a status where the brake fluid pressure retainer device retains no brake fluid pressure, and brakes are capable of being normally applied.

FIG. 7 illustrates a status where the brake fluid pressure retainer device retains a brake fluid pressure. FIG. 8 illustrates a status where the movable shutoff valve is closed, which is transitioned to a status where the movable shutoff valve is opened. In FIGS. 6 to 8, components similar to those illustrated in FIGS. 4 and 5 are provided with the same reference numerals, and the descriptions of such components are omitted.

In the brake fluid pressure retainer device according to a third embodiment, the electromagnetic driving part 30 drives the solenoid plunger 34 in a direction where the movable valve body 22 moves away from the valve seat 24a. That is, the electromagnetic driving part 30 is utilized for opening the movable shutoff valve 20. In order to achieve the above, the front end of the movable member 36 is coupled with the movable valve body 22 in a fixed fashion, such that the movable valve body 22 is configured to integrally move with the solenoid plunger 34. In FIGS. 6 to 8, a solid circle indicates a part of the front end of the movable member 36 that is coupled with the movable valve body 22.

To release the retained brakes, the movable valve body 22 is moved in a direction away from the valve seat 24a by driving the electromagnetic driving part 30 simultaneously with causing the brake fluid to flow from the braking device side to the brake pedal side by opening the electromagnetic open-close valve 10, as illustrated in FIG. 8. Accordingly, in addition to the spring force of the spring 26, the magnetic force generated by the electromagnetic driving part 30 may also move the movable valve body 22 to open the movable shutoff valve 20. Thus, when the retained brakes are released, the movable shutoff valve 20 may rapidly and reliably be opened. Note that immediately after the electromagnetic open-close valve 10 is opened, the brake fluid pressure inside the movable shutoff valve 20 is still retained at a high pressure level. Thus, the movable shutoff valve 20 will open after the pressure of the brake fluid in the movable shutoff valve 20 is lowered to a certain level.

Next, a brake fluid pressure retainer device according to a fourth embodiment is described.

Figure 9:
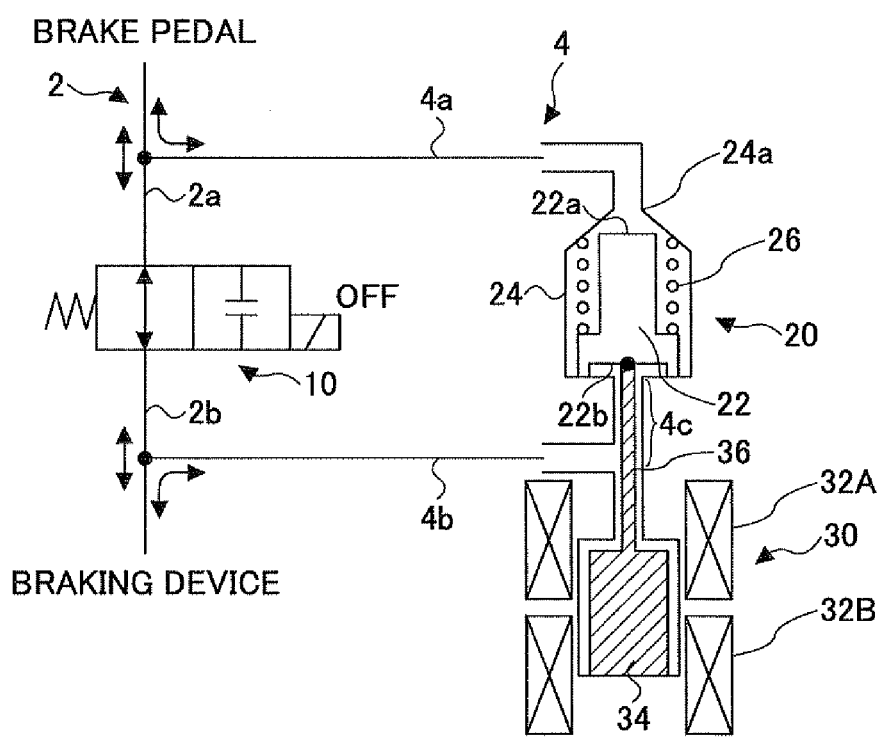
FIG. 9 is a fluid pressure circuit diagram illustrating an overall configuration of a brake fluid pressure retainer device according to a fourth embodiment.
Figure 10:
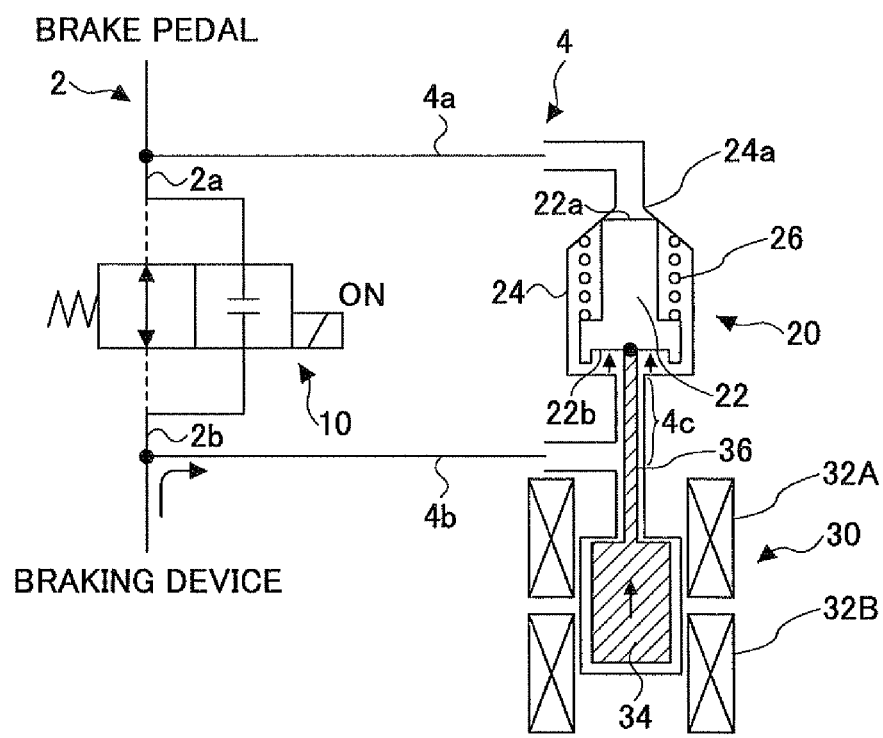
FIG. 10 is another fluid pressure circuit diagram illustrating the overall configuration of the brake fluid pressure retainer device according to the fourth embodiment.
Figure 11:
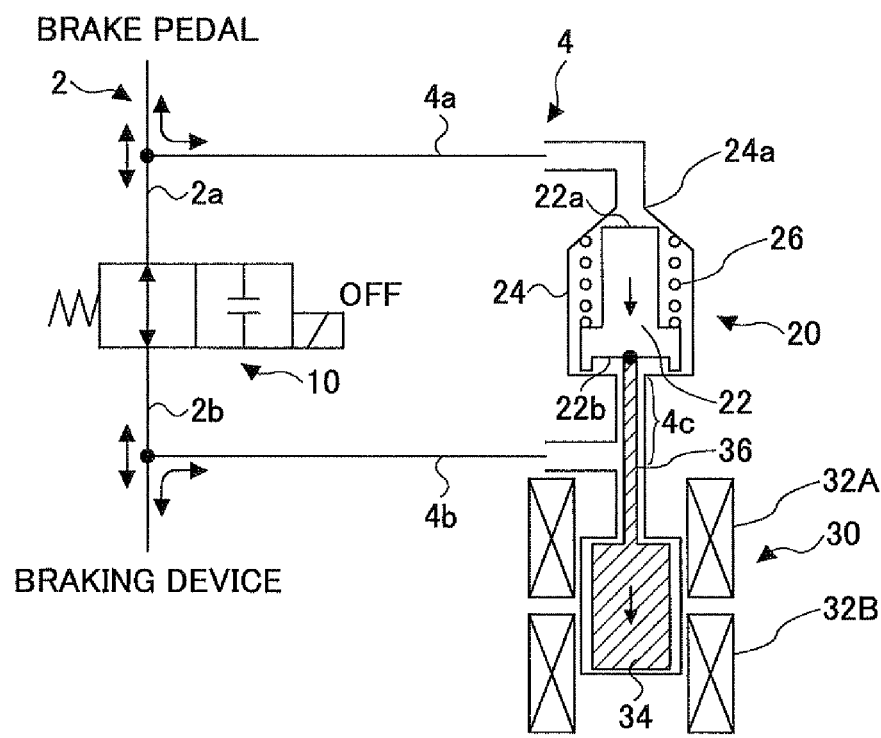
FIG. 11 is another fluid pressure circuit diagram illustrating the overall configuration of the brake fluid pressure retainer device according to the fourth embodiment.

FIGS. 9 to 11 are fluid pressure circuit diagrams each illustrating an overall configuration of a brake fluid pressure retainer device according to the fourth embodiment. FIG. 9 illustrates a status where the brake fluid pressure retainer device retains no brake fluid pressure, and brakes are capable of being normally applied. FIG. 10 illustrates a status where the brake fluid pressure retainer device retains a brake fluid pressure. FIG. 11 illustrates a status where the movable shutoff valve is closed, which is transitioned to a status where the movable shutoff valve is opened. In FIGS. 9 to 11, components similar to those illustrated in FIGS. 4 and 5 are provided with the same reference numerals, and the descriptions of such components are omitted.

In the brake fluid pressure retainer device according to the fourth embodiment, the electromagnetic driving part 30 drives the solenoid plunger 34 in two directions, that is, in a direction where the movable valve body 22 moves toward the valve seat 24a, and in a direction where the movable valve body 22 moves away from the valve seat 24a. That is, the electromagnetic driving part 30 is utilized for closing and opening the movable shutoff valve 20. In order to achieve the above, the front end of the movable member 36 is coupled with the movable valve body 22 in a fixed fashion, such that the movable valve body 22 is configured to integrally move with the solenoid plunger 34. In FIGS. 9 to 11, a solid circle indicates a part of the front end of the movable member 36 that is coupled with the movable valve body 22.

In the fourth embodiment, in order to drive the solenoid plunger 32 in two directions, the electromagnetic coil 32 of the electromagnetic driving part 30 includes electromagnetic coils 32A and 32B. The electromagnetic coil 32A drives the solenoid plunger 34 in a direction where the movable valve body 22 moves forward to the valve seat 24a. The electromagnetic coil 32B drives the solenoid plunger 34 in a direction where the movable valve body 22 moves away from the valve seat 24a.

The electric current is applied to the electromagnetic coil 32A of the electromagnetic driving part 30 simultaneously with closing the electromagnetic open-close valve 10 for retaining the brakes, which drives the solenoid plunger 34 to move the movable valve body 22 forward to the valve seat 24a to forcibly close the movable shutoff valve 20. That is, the movable valve body 22 is moved by utilizing pressing force generated by driving the solenoid plunger 34 as well as utilizing the back pressure obtained due to the flow of the brake fluid, which may rapidly and reliably close the movable shutoff valve 20.

On the other hand, to release the retained brakes, the movable valve body 22 is moved in a direction of moving away from the valve seat 24a by applying the electric current to the electromagnetic coil 32B of the electromagnetic driving part 30 to drive the solenoid plunger 34, simultaneously with causing the brake fluid to flow from the braking device side to the brake pedal side by opening the electromagnetic open-close valve 10, as illustrated in FIG. 11. Accordingly, in addition to the spring force of the spring 26, the magnetic force generated by the electromagnetic driving part 30 may also move the movable valve body 22 to open the movable shutoff valve 20. Thus, when the retained brakes are released, the movable shutoff valve 20 may rapidly and reliably be opened.

Next, a brake fluid pressure retainer device according to a fifth embodiment is described.

Figure 12:
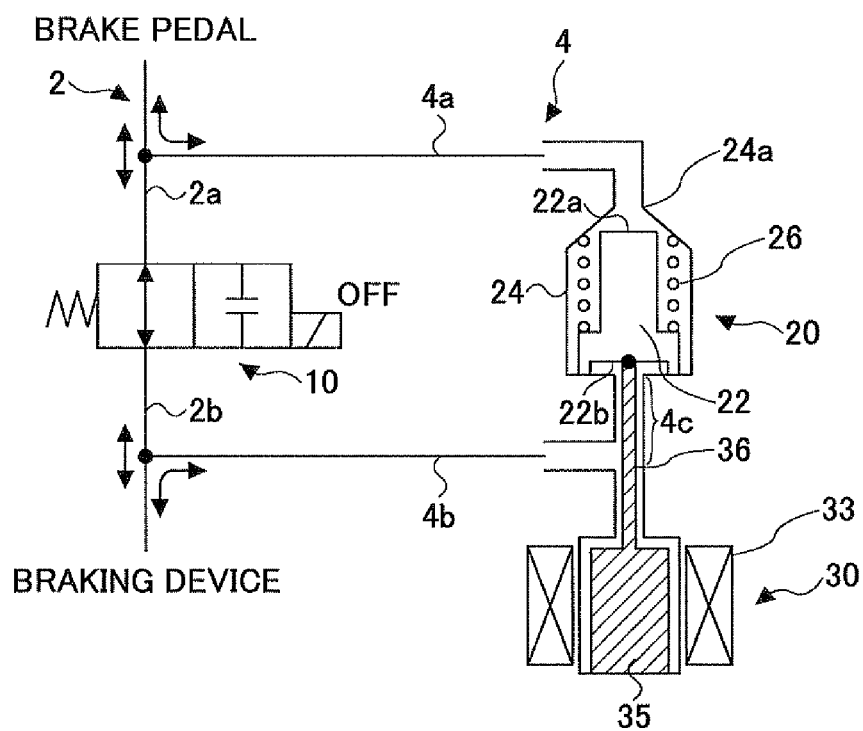
FIG. 12 is a fluid pressure circuit diagram illustrating an overall configuration of a brake fluid pressure retainer device according to a fifth embodiment.
Figure 13:
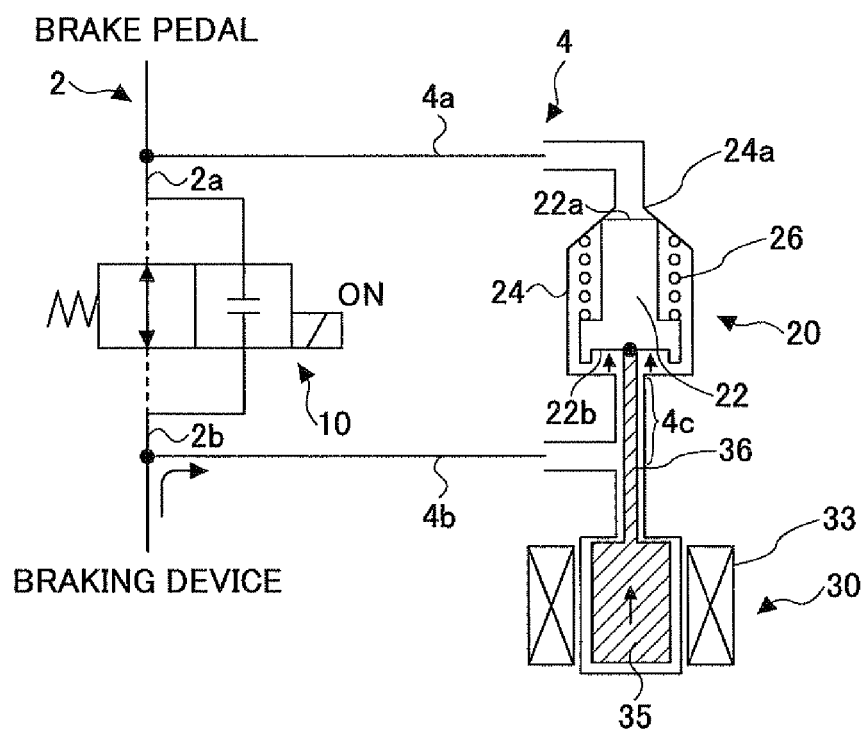
FIG. 13 is another fluid pressure circuit diagram illustrating the overall configuration of the brake fluid pressure retainer device according to the fifth embodiment.
Figure 14:
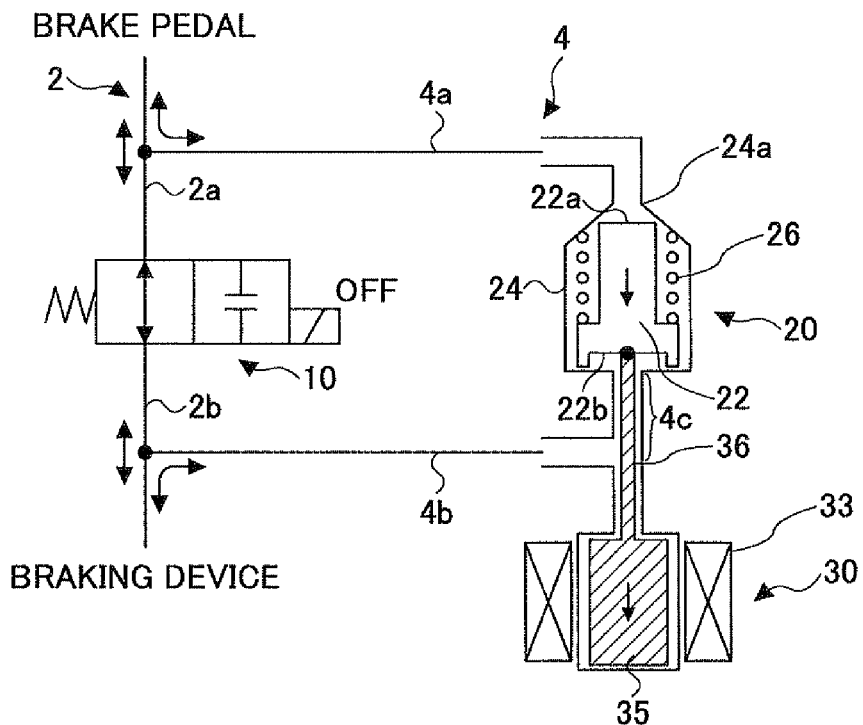
FIG. 14 is another fluid pressure circuit diagram illustrating the overall configuration of the brake fluid pressure retainer device according to the fifth embodiment.

FIGS. 12 to 14 are fluid pressure circuit diagrams each illustrating an overall configuration of a brake fluid pressure retainer device according to the fifth embodiment. FIG. 12 illustrates a status where the brake fluid pressure retainer device retains no brake fluid pressure, and brakes are capable of being normally applied. FIG. 13 illustrates a status where the brake fluid pressure retainer device retains a brake fluid pressure. FIG. 14 illustrates a status where the movable shutoff valve is closed, which is transitioned to a status where the movable shutoff valve is opened. In FIGS. 12 to 14, components similar to those illustrated in FIGS. 4 and 5 are provided with the same reference numerals, and the descriptions of such components are omitted.

In the brake fluid pressure retainer device according to the fifth embodiment, the electromagnetic driving part 30 drives a solenoid plunger 35 formed of a permanent magnet in two directions, that is, in a direction where the movable valve body 22 moves forward to the valve seat 24a, and in a direction where the movable valve body 22 moves away from the valve seat 24a. The electromagnetic driving part 30 includes an electromagnetic coil 33 for driving the solenoid plunger 35 formed of a permanent magnet. The solenoid plunger 35 formed of a permanent magnet generates a drive force (pressing force) by a magnetic field, which is generated by supplying a current to the electromagnetic coil 33. The driving direction of the solenoid plunger 35 may be reversed by changing a flowing direction of the current into an opposite direction.

The electromagnetic driving part 30 in the first to the fourth embodiments generates magnetic attraction by a magnetic field generated from the electromagnetic coil 32, and drives the solenoid plunger 34 formed of a magnetic body with the generated magnetic attraction by magnetically attracting the solenoid plunger 34. On the other hand, in the electromagnetic driving part 30 in the fifth embodiment, the solenoid plunger 35 formed of a permanent magnet is magnetically driven by a magnetic field, which is generated in the periphery of the solenoid plunger 35 by the electromagnetic coil 33. Accordingly, the solenoid plunger 35 may be driven bidirectionally by changing a direction of a current flowing into the magnetic coil 33.

The electric current is applied to the electromagnetic coil 33 of the electromagnetic driving part 30 in a predetermined direction, simultaneously with closing the electromagnetic open-close valve 10 for retaining the brakes, which drives the solenoid plunger 35 to move the movable valve body 22 forward to the valve seat 24a to forcibly close the movable shutoff valve 20. That is, the movable valve body 22 is moved by utilizing pressing force generated by driving the solenoid plunger 35 as well as utilizing the back pressure obtained due to the flow of the brake fluid, which may rapidly and reliably close the movable shutoff valve 20.

On the other hand, to release the retained brakes, the movable valve body 22 is moved in a direction of moving away from the valve seat 24a by applying the electric current to the electromagnetic coil 33 of the electromagnetic driving part 30 in a direction opposite to a direction of applying the electric current to the electromagnetic coil 33 when the brakes are retained to drive the solenoid plunger 35, simultaneously with causing the brake fluid to flow from the braking device side to the brake pedal side by opening the electromagnetic open-close valve 10, as illustrated in FIG. 14. Accordingly, in addition to the spring force of the spring 26, the magnetic force generated by the electromagnetic driving part 30 may also move the movable valve body 22 to open the movable shutoff valve 20. Thus, when the retained brakes are released, the movable shutoff valve 20 may rapidly and reliably be opened.

Next, a brake fluid pressure retainer device according to a sixth embodiment is described.

Figure 15:
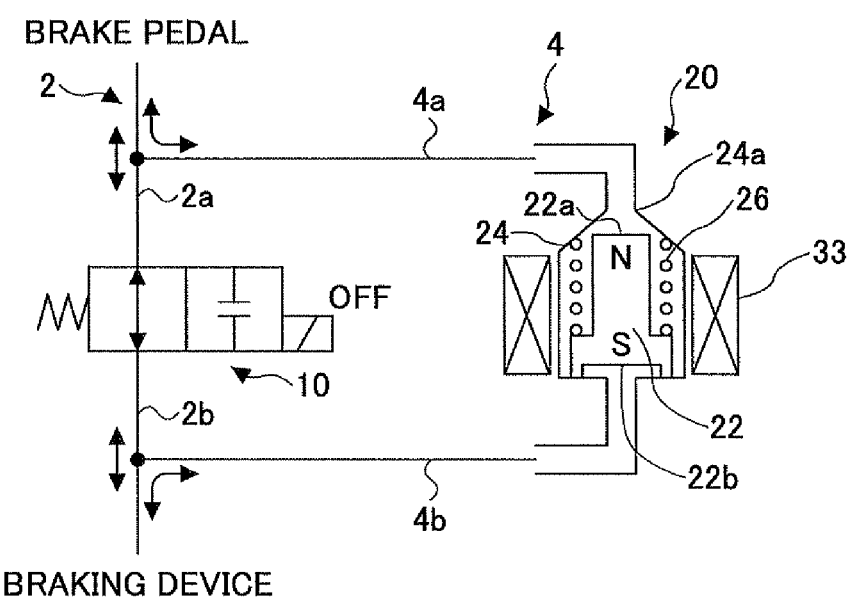
FIG. 15 is a fluid pressure circuit diagram illustrating an overall configuration of a brake fluid pressure retainer device according to a sixth embodiment.
Figure 16:
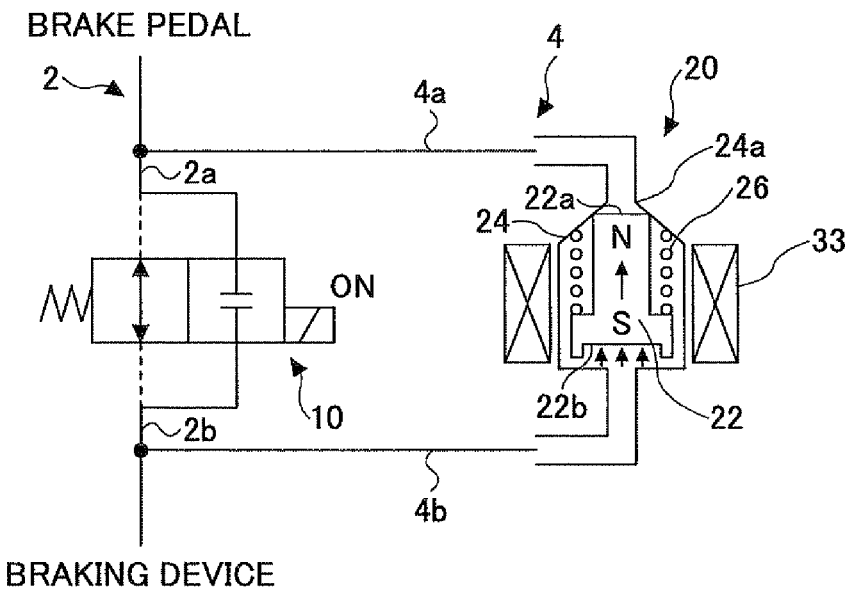
FIG. 16 is another fluid pressure circuit diagram illustrating the overall configuration of the brake fluid pressure retainer device according to the sixth embodiment.
Figure 17:
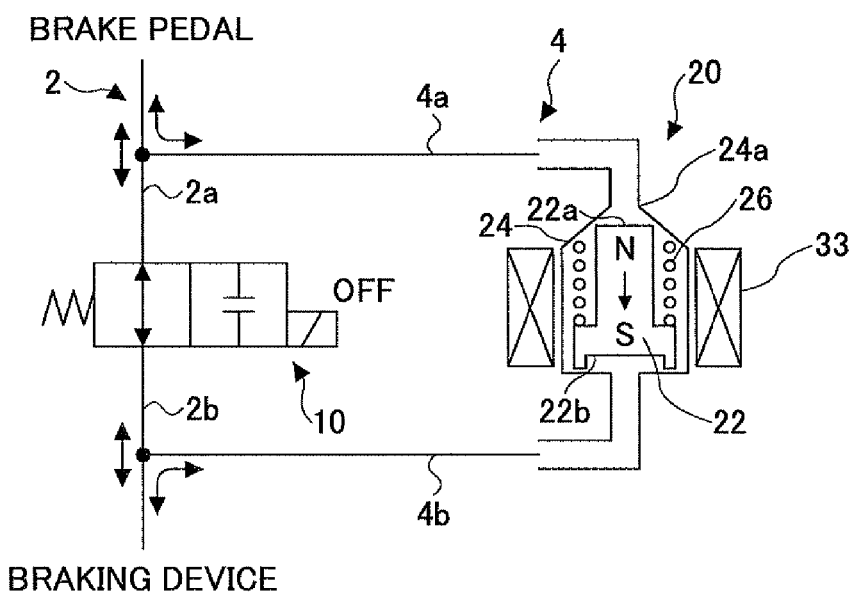
FIG. 17 is another fluid pressure circuit diagram illustrating the overall configuration of the brake fluid pressure retainer device according to the sixth embodiment.

FIGS. 15 to 17 are fluid pressure circuit diagrams each illustrating an overall configuration of a brake fluid pressure retainer device according to the sixth embodiment. FIG. 15 illustrates a status where the brake fluid pressure retainer device retains no brake fluid pressure, and brakes are capable of being normally applied. FIG. 16 illustrates a status where the brake fluid pressure retainer device retains a brake fluid pressure. FIG. 17 illustrates a status where the movable shutoff valve 20 is closed, which is transitioned to a status where the movable shutoff valve is opened. In FIGS. 15 to 17, components similar to those illustrated in FIGS. 11 and 14 are provided with the same reference numerals, and the descriptions of such components are omitted.

In the brake fluid pressure retainer device according to the sixth embodiment, the electromagnetic driving part 30 includes the movable valve body 22 amain body of which is formed of a permanent magnet and the electromagnetic coil 33 formed in the periphery of the case 24. That is, the solenoid plunger 35 and the movable valve body 22 in the above-described fifth embodiment are integrally formed, and the movable valve body 22 is configured to be directly driven by the electromagnetic coil 33. The movable valve body 22 may be driven bidirectionally by changing a direction of a current flowing into the magnetic coil 33 in a manner similar to the fifth embodiment. The permanent magnet used as the main body of the movable valve body 22 may be any types of the permanent magnet; however, it is preferable to use a so-called plastic magnet, which is a permanent magnet formed by mixing magnetic powder into resin, solidifying the mixture, and magnetizing the solidified mixture, because the plastic magnet exhibits excellent shock resistance.

In the brake fluid pressure retainer device according to the sixth embodiment, since the movable valve body 22 is formed of a permanent magnet, there may be no need of disposing the solenoid plunger 35, nor disposing the movable member 36. Accordingly, the brake fluid pressure retainer device may be reduced in size. Further, since there is no need of disposing the movable member 36 inside the bypass passage 4b, it may be unnecessary to thicken the piping part 4c (corresponding to a part of the bypass passage 4b) to accommodate the movable member 36.

Figure 18:
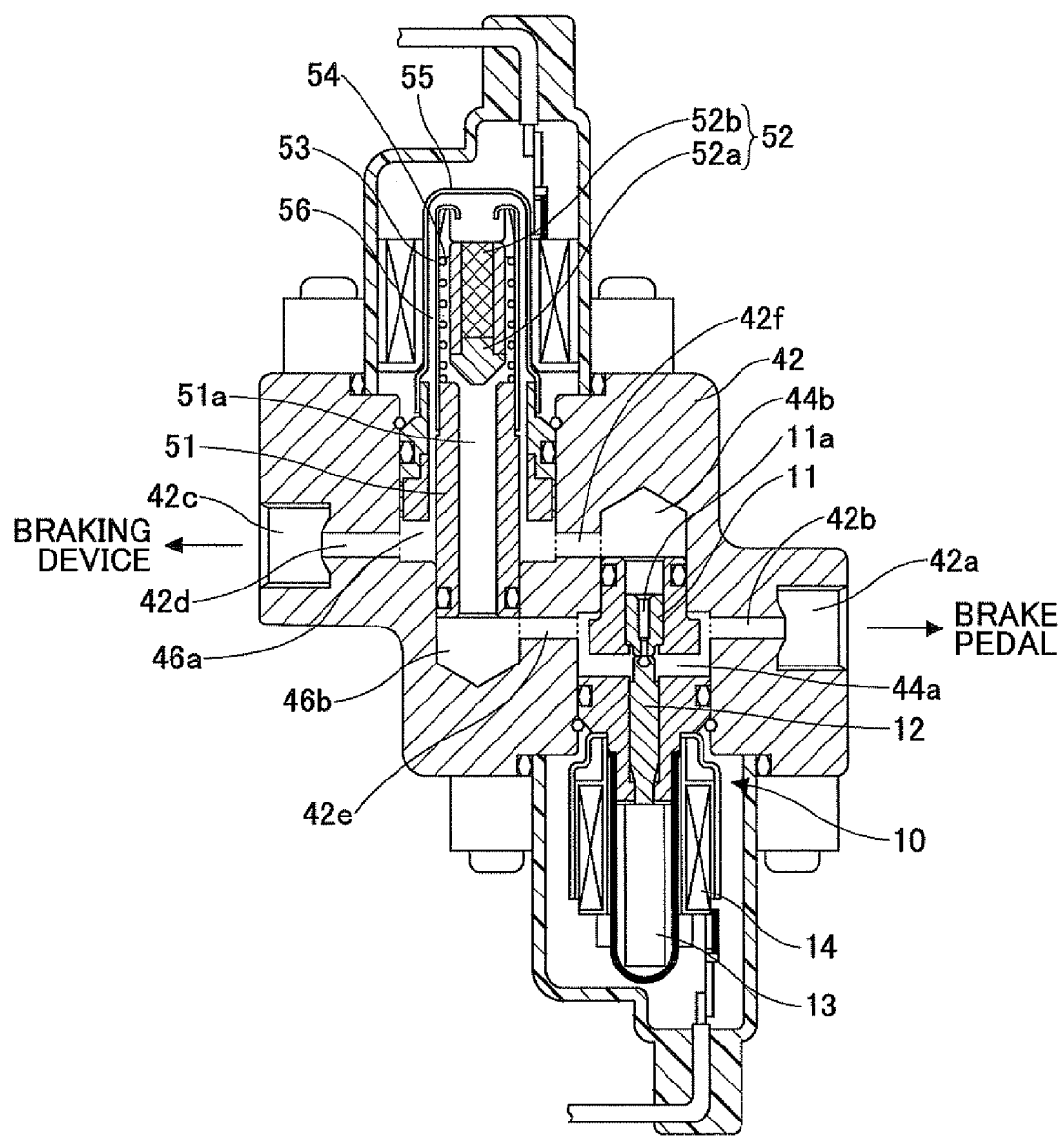
FIG. 18 is a cross-sectional diagram illustrating a brake fluid pressure retainer device in which an electromagnetic open-close valve and a movable shutoff valve are integrally formed.

FIG. 18 is a cross-sectional diagram illustrating a brake fluid pressure retainer device in which an electro-magnetic open-close valve 10 and a movable shutoff valve 20 are integrally formed. FIG. 18 illustrates the brake fluid pressure retainer device according to the sixth embodiment composed as one device; however, the brake fluid pressure retainer device according to the first to fifth embodiments may be composed of one device in a similar manner as the brake fluid pressure retainer device according to the sixth embodiment.

Since the brake fluid pressure retainer device 40 illustrated in FIG. 18 is formed as one device by combining the electromagnetic open-close valve 10 and the movable shutoff valve 20, the brake fluid pressure retainer device 40 includes one shared housing 42. The housing 42 may, for example, be formed of lightweight metal such as aluminum alloy.

An electromagnetic open-close valve hole 44 for forming the electromagnetic open-close valve 10 is formed in a part of the housing 42 (a right half in FIG. 18).

The electromagnetic open-close valve hole 44 includes a two-phase hole having a major diameter part 44a with a large diameter on an entrance side, and a minor diameter part 44b with a small diameter at the back side of the major diameter part 44a. Note that in FIG. 18, a reference numeral 44 is not indicated; however, a hole having the major diameter part 44a and the minor diameter part 44b corresponds to the electromagnetic open-close valve hole 44.

A valve seat 11 is disposed on the minor diameter part 44b. The valve seat 11 includes a fluid passage 11a formed by penetrating the valve seat 11. One end of the fluid passage 11a serves as an opening of the valve seat 11, which is connected to a space of the major diameter part 44a of the electromagnetic open-close valve hole 44.

The other end of the fluid passage 11a is connected to a space of the minor diameter part 44b of the electromagnetic open-close valve hole 44.

A valve body 12 is disposed such that the valve body 12 faces the valve seat 11 in the major diameter part 44a of the electromagnetic open-close valve hole 44. The valve body 12 is connected to a movable element 13, such that the valve body 12 is in a status of being pressed on the valve seat 11 (i.e., in a valve-closed status) or in a status of being away from the valve seat 11 (i.e., in a valve-open status) by driving the movable element 13. The movable element 13 is formed of a magnetic body, and a magnetic field is generated when a current is supplied to an electromagnetic coil 14. Accordingly, the movable element 13 is moved to an upper-middle part of FIG. 18 due to magnetic attraction acting on the movable element 13. Accordingly, the valve body 12 moves toward the valve seat 11, and comes in contact with the valve seat 11 (seating) to be pressed on the valve seat 11, thereby allowing the electromagnetic open-close valve 10 to be in a closed status (a status illustrated in FIG. 18).

A pedal side connecting port 42a of the housing 42 is connected to the space of the major diameter part 44a of the electromagnetic open-close valve hole 44 via a fluid passage 42b. Accordingly, the brake fluid flowing from the brake pedal side passes through the fluid passage 42b and flows into the major diameter part 44a of the electromagnetic open-close valve hole 44. Thereafter, while the electromagnetic open-close valve 10 is open, the brake fluid flows from the opening of the valve seat 11 into the fluid passage 11a, passes through the fluid passage 11a, and flows into the minor diameter part 44b of the electromagnetic open-close valve hole 44.

A movable shutoff valve hole 46 for forming the movable shutoff valve 20 is formed in a part of the housing 42 (a left half in FIG. 18). The movable shutoff valve hole 46 includes a two-phase hole having a major diameter part 46a with a large diameter on an entrance side, and a minor diameter part 46b with a small diameter at the back side of the major diameter part 46a. Note that in FIG. 18, a reference numeral 46 is not indicated; however, a hole having the major diameter part 46a and the minor diameter part 46b corresponds to the movable shutoff valve hole 46.

A valve seat 51 is disposed on the minor diameter part 46b of the movable shutoff valve hole 46. The valve seat 51 includes a fluid passage 51a formed by penetrating the valve seat 51. The valve seat 51 corresponds to the valve seat 24a in the above-described embodiments. One end of the fluid passage 51a serves as an opening of the valve seat 51, and the other end of the fluid passage 51a is connected to a space of the minor diameter part 46b of the movable shutoff valve hole 46.

A valve body 52 is disposed such that the valve body 52 faces the opening of the valve seat 51. The front end of the valve body 52 serves as a valve 52a that comes in contact with the valve seat 51 such that the opening of the valve seat 51 is closed with the front end of the valve body 52. A permanent magnet 52b is fixed on a rear side of the valve 52a. The valve body 52 corresponds to the movable valve body 22 in the above-described sixth embodiment. An inner cover 53 is disposed in the periphery of the valve body 52, and a spring 54 configured to apply force in a direction of moving the valve body 52 away from the valve seat 51 is disposed between the valve body 52 and the inner cover 53. An outer cover 55 is attached to the periphery of the inner cover 53 such that the movable shutoff valve hole 46 is hermetically-closed with the outer cover 55. A fluid passage 56 configured to allow the brake fluid to flow is formed between an inner circumferential surface of the outer cover 55 and an outer circumferential surface of the inner cover 53. The fluid passage 56 is connected to a space of the major diameter part 46a of the movable shutoff valve hole 46.

A braking device side connecting port 42c of the housing 42 is connected to the space of a major diameter part 46a of the movable shutoff valve hole 46 via a fluid passage 42d. Accordingly, the brake fluid flowing from the braking device side passes through the fluid passage 42d and flows into the major diameter part 46a of the movable shutoff valve hole 46. Then, when the valve body 52 of the movable shutoff valve 20 moves away from the valve seat 51 such that the movable shutoff valve 20 is open, the brake fluid passes through the fluid passage 56 to flow into the inner cover 53 from a rear side of the valve body 52. Thereafter, the brake fluid flows between the inner circumferential surface of the inner cover 53 and the outer circumferential surface of the valve body 52, passes through the opening of the valve seat 51, and flows into a minor diameter part 46b of the movable shutoff valve hole 46. The minor diameter part 46b of the movable shutoff valve hole 46 and the major diameter part 44a of the electromagnetic open-close valve hole 44 are connected via a fluid passage 42e. Accordingly, the brake fluid flowing into the minor diameter part 46b of the movable shutoff valve hole 46 passes through the fluid passage 42e, the major diameter part 44a of the electromagnetic open-close valve hole 44, and the pedal side connecting port 42a of the housing 42 via the fluid passage 42b, and then flows toward the brake pedal side.

The flow of the above brake fluid corresponds to a return operation of the brake fluid in a normal braking operation. The electromagnetic open-close valve 10 is open in the normal braking operation. Note that the major diameter part 46a of the movable shutoff valve hole 46 and the minor diameter part 44b of the electromagnetic open-close valve hole 44 are connected via a fluid passage 42f. Accordingly, the brake fluid passing through the braking device side connecting port 42c from the braking device side and flowing into the major diameter part 46a of the movable shutoff valve hole 46 not only moves toward the fluid passage 42d as described above, but a part of the brake fluid also passes though the fluid passage 42f to flow into the minor diameter part 44b of the electromagnetic open-close valve hole 44. At this moment, since the electromagnetic open-close valve 10 is open, the brake fluid passes through the fluid passage 11a of the valve seat 11 to flow into the minor diameter part 46b of the movable shutoff valve hole 46, passes through the pedal side connecting port 42a of the housing 42 via the fluid passage 42b, and then flows toward the brake pedal side.

As described above, the brake fluid flows via the electromagnetic open-close valve 10 and movable shutoff valve 20 in the normal braking operation. Accordingly, a large amount of the brake fluid may be able to flow rapidly, thereby implementing an excellent braking operation with improved responsiveness.

On the other hand, the closing of the electromagnetic open-close valve 10 automatically closes the movable shutoff valve 20 in a braking force retaining operation. When the vehicle is stopped by applying brakes, the controller detects the application of brakes to close the electromagnetic open-close valve 10. Then, the high-pressure brake fluid attempting to return from the braking device side to the brake pedal side will not be allowed to flow from the major diameter part 46a of the movable shutoff valve hole 46 into the minor diameter part 44b of the electromagnetic open-close valve hole 44. Instead, all the brake fluid passes through a fluid passage 56 of the movable shutoff valve 20 to flow into the inner cover 53 from the rear side of the valve body 52. This flow of the brake fluid presses the valve body 52 to be moved toward the valve seat 51.

When the valve body 52 comes in contact with the valve seat 51 (seated), the high pressure brake fluid is still applied to the valve body 52 side. However, the brake fluid inside the fluid passage 51a of the valve seat 51 may still flow toward the brake pedal side. Hence, the brake fluid pressure inside the fluid passage 51a of the valve seat 51 may drop drastically. Accordingly, a differential pressure of the brake fluid is applied to the valve body 52 while the opening of the valve seat 51 is closed with the valve body 52. Since the differential pressure of the brake fluid strongly presses the valve body 52 against the valve seat 51, the movable shutoff valve may be closed reliably. When the electromagnetic open-close valve 10 is closed, the movable shutoff valve 20 is automatically closed as described above. Hence, the high pressure brake fluid may be retained on the braking device side to achieve retaining of the brakes.

In order to release the retained brakes, since the brake fluid inside the major diameter part 46a of the movable shutoff valve hole 46 passes through the electromagnetic open-close valve 10 to flow toward the braking device side by simply opening the electromagnetic open-close valve 10, the brake pressure may be returned from the braking device side to the brake pedal side. At this moment, since the brake fluid pressure inside the major diameter part 46a of the movable shutoff valve hole 46 is lowered, the differential pressure applied to the valve body 52 of the movable shutoff valve 20 is decreased. Hence, the valve body 52 is moved by spring force of the spring 54 in a direction of moving away from the valve seat 51. Accordingly, the movable shutoff valve is in an open status in which the normal braking operation may be performed.

Figure 19:
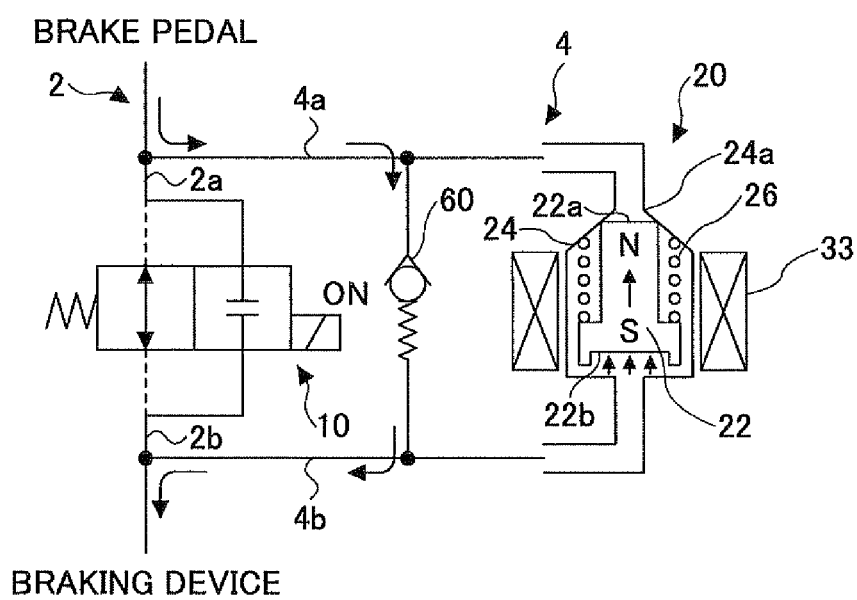
FIG. 19 is a fluid pressure circuit diagram illustrating an overall configuration of a brake fluid pressure retainer device in which a check valve is disposed in parallel with the movable shutoff valve.

Note that in the first and sixth embodiments, when the braking force is desired to be increased in the braking force retaining operation (so-called "brake retightening"), the brake fluid pressure may be increased by pressing down the brake pedal, such that the brake fluid pressure is higher than the brake remaining pressure. That is, the differential pressure applied to the movable valve body 22 of the movable shutoff valve 20 to press the movable valve body 22 may reversely be applied. Accordingly, the movable valve body 22 may move away from the valve seat 24a to allow the brake fluid to flow toward the braking device side. Further, a check valve 60 may be disposed in parallel with the movable shutoff valve 20 in order to perform such brake retightening, as illustrated in FIG. 19.

According to the above-described brake fluid pressure retainer device, both the electromagnetic open-close valve and the movable shutoff valve are open to allow the brake fluid to rapidly flow into the electromagnetic open-close valve and the movable shutoff valve in a normal braking operation, and the electromagnetic open-close valve is closed so as to automatically close the movable shutoff valve in a braking force retaining operation. Accordingly, a braking operation exhibiting excellent responsiveness and a reliable braking force retaining operation may be implemented.

The present invention is not limited to the embodiments disclosed above, and various modifications and alterations may be made without departing from the scope of the invention described in the claims.

The present invention is utilized for a braking device of a vehicle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A brake fluid pressure retainer device for use in a vehicle incorporating a fluid pressure braking device, the brake fluid pressure retainer device comprising:
    an electromagnetic open-close valve disposed in a brake fluid passage between a brake pedal and a braking device provided for wheels; and
    a movable shutoff valve disposed in parallel with the electro-magnetic open-close valve for the brake fluid passage, and including
        a movable valve body movable in a flowing direction of a brake fluid from the braking device to the brake pedal,
        wherein the body has a rear end and an opposite front end downstream of the rear end;
        a valve seat configured to receive the front end of the movable valve body to shut off the brake fluid; and
        a spring configured to apply force to the movable valve body in an upstream direction.

2. The brake fluid pressure retainer device as claimed in claim 1,
    wherein a brake fluid pressure receiving area at the rear end is greater than a brake fluid pressure receiving area at the front end.

3. The brake fluid pressure retainer device as claimed in claim 2,
    wherein an area of the rear end is greater than an area of an opening of the valve seat.

4. The brake fluid pressure retainer device as claimed in claim 1, wherein
    the movable shutoff valve includes an electromagnetic driving part configured to move the movable valve body in at least one of a direction in which the movable valve body moves toward the valve seat, and a direction in which the movable valve body moves away from the valve seat.

5. The brake fluid pressure retainer device as claimed in claim 4, wherein
    the electromagnetic driving part includes
    a movable member connected to the rear end part of the movable valve body;
    a plunger formed of a magnetic body and configured to be fixed to the movable member; and
    an electromagnetic coil configured to drive the plunger.

6. The brake fluid pressure retainer device as claimed in claim 5, wherein
    the electromagnetic coil includes
    a first electromagnetic coil configured to drive the plunger in a direction in which the movable valve body moves toward the valve seat; and a second electromagnetic coil configured to drive the plunger in a direction in which the movable valve body moves away from the valve seat.

7. The brake fluid pressure retainer device as claimed in claim 4, wherein the electromagnetic driving part includes a movable member connected to the rear end part of the movable valve body;

a plunger formed of a permanent magnet and configured to be fixed to the movable member; and an electromagnetic coil configured to drive the plunger in at least one of a direction in which the movable valve body moves toward the valve seat, and a direction in which the movable valve body moves away from the valve seat.

8. The brake fluid pressure retainer device as claimed in claim 4, wherein the movable valve body integrally incorporates a permanent magnet, and the electromagnetic driving part includes the permanent magnet and an electromagnetic coil disposed in a periphery of the movable valve body.

9. The brake fluid pressure retainer device as claimed in claim 1, further comprising:

a check valve disposed in parallel with the electromagnetic open-close valve, wherein the check valve is configured to allow the brake fluid to flow from a brake pedal to the braking device, and to prevent the brake fluid from flowing from the braking device to the brake pedal.

\* \* \* \* \*